United States Patent [19]

Fujita

[11] Patent Number: 4,577,967

[45] Date of Patent: Mar. 25, 1986

[54] SURFACE SHAPE MEASUREMENT APPARATUS

[75] Inventor: Hiroo Fujita, Tanashi, Japan

[73] Assignee: Citizen Watch Co., Ltd., Tokyo, Japan

[21] Appl. No.: 611,062

[22] Filed: May 17, 1984

[30] Foreign Application Priority Data

May 20, 1983 [JP] Japan ................................. 58-88827
May 24, 1983 [JP] Japan ................................. 58-90998

[51] Int. Cl.⁴ .............................................. G01B 9/02
[52] U.S. Cl. .................................... 356/349; 356/359
[58] Field of Search ........................ 356/349, 359, 360

[56] References Cited

U.S. PATENT DOCUMENTS 3,523,735 8/1970 Taylor ................................. 356/349
4,298,283 11/1981 Makosch et al. ............... 356/349 X

OTHER PUBLICATIONS

Baronian, "Acoustooptic Bragg Diffraction Devices and Their Applications", *IEEE '74 Region Six Conference*, pp. 70–77, 1974.

Sommargren, "Optical Heterodyne Profilometry", *Applied Optics*, vol. 20, No. 4, pp. 610–618, Feb. 1981.

*Primary Examiner*—Davis L. Willis
*Assistant Examiner*—Matthew W. Koren
*Attorney, Agent, or Firm*—Jordan and Hamburg

[57] ABSTRACT

A surface shape measurement apparatus of non-contact type is based upon acousto-optical scanning means for producing a pair of polarized light beams differing in frequency by a fixed amount, which are scanned twice in succession across the surface to be measured in a succession of steps, with an electrical signal being produced by heterodyne interference of the resultant reflected light. Variations in phase of this signal, produced during the first scan, are processed to derive a set of data values representing measurement errors produced during the successive steps, which are utilized to correct a set of phase measurement values obtained during the second scan. The corrected phase measurement values thus obtained are integrated to produced surface shape data, with an accuracy of approximately 0.01 μm or better being attainable.

10 Claims, 18 Drawing Figures

SURFACE SHAPE MEASUREMENT APPARATUS

BACKGROUND OF THE INVENTION

In recent years, the accuracy of machining which is possible using precision machine tools has progressed substantially, and as a result there is an urgent requirement for apparatus to measure the shape and roughness of a machined surface to a substantially higher level of accuracy than has been possible in the prior art.

The principal method of precision surface shape measurement which has been used on a practical engineering bases until now is based upon homodyne interferency of light. With this method, two light beams of identical frequency are directed onto the surface under measurement, and interference (i.e. homodyne interference) resulting from this is sensed and measured. Such a method provides a maximum level of measurement accuracy of the order 0.1 μm, which is insufficient for many present-day applications.

A modification of the homodyne interference method has been proposed, whereby data representing the phase relationships and amplitude of interference fringes produced by homodyne interference is processed, to thereby derive optical path differences and hence measure surface height variations to a high degree of precision. However such a method requires complex and hence expensive data-processing circuits, which has prevented its practical implementation.

A further disadvantage of prior art types of surface shape measurement apparatus is that in order to scan light beams over the surface, to derive surface shape information, the light beams are generally held in a fixed orientation while body having the surface to be measured is moved with respect to the light beams. The resultant errors which result, due to this physical movement of the surface, set a limitation to the accuracy which can be obtained by practical types of apparatus.

SUMMARY OF THE INVENTION

It is an objective of the present invention to overcome the disadvantages of the prior art described above, and to provide a surface shape measurement apparatus which achieves a very high degree of measurement accuracy by utilizing heterodyne interference of light to measure minutes variations in surface height as differences in path length of a pair of light beams incident on the surface under measurement, which are scanned across the surface in a succession of uniform steps. In order to maintain the very high level of accuracy attainable with the heterodyne interference of light method, the light beams used for measurement are successively shifted, by means of an acousto-optical light deflector, while the body having the surface under measurement is held stationary.

Due to this shifting of the direction of the scanning light beams, the beam positions will deviate substantially from the optical axis of the optical system used to direct and focus the light beams onto the surface, which inevitably results in measurement errors. With the very high level of measurement accuracy involved (e.g. to 0.01 μm or better), it is impossible to apply any form of fixed compensation for such errors, which can vary in an unpredictable manner for a variety of caused, for example as a result of small changes in the operating temperature of the optical system, etc. For this reason a surface shape measurement apparatus according to the present invention performs each surface measurement operation, along a line section of the surface under measurement, as two successive scans over the surface. During the first scan, a pair of light beams which differ in frequency by a fixed amount and are spaced apart by a fixed distance light beams are moved in a succession of steps of uniform amplitude along the surface. The level of interference produced between the resultant light beams reflected from the surface is converted into an electrical signal, whose deviation from a reference phase value during each step is measured. The resultant phase difference values are then processed to derive a set of values each representing an amount of measurement error produced during a scanning step. A second scan is then performed, with the amplitude of the steps in this case being identical to that for the first scan, and with the distance separating the light being made identical to the scanning step amplitude, so that the trailing light beam successively overlaps positions previously illuminated by the leading light beam. As a result, a set of phase difference values are derived for the scanning steps, each of which results from a combination of a difference between the heights of the positions of incidence of the light beams on the surface under measurement during the corresponding step and a certain amount of measurement error, the latter resulting from the causes described above. Processing is then performed on the latter measured phase difference values, to subtract the previously derived measurement error values from the measured phase difference values. In this way, a set of corrected phase difference values are produced. These are integrated, to provide the required data representing the shape of the surface under measurement.

To ensure accuracy of phase measurement, a pair of light beams which emerge from the acousto-optical light deflector, and which are successively deflected in uniform angular increments to provide the scanning steps described above, are split into two pairs of light beams. These constitute a probe light beam pair, which are directed onto the surface under measurement, as described above, and a reference light beams pair which are used to produce a phase reference signal, used for comparison with the signal produced by heterodyne interference of the reflected light. Use of such a reference light beam pair serves to eliminate many sources of measurement inaccuracy, such as the effects of temperature upon the characteristics of the optical system, etc, and ensures practicability of use of such an apparatus in a normal industrial environment.

DESCRIPTION OF THE PREFERRED EMBODIMENTS

Figure 1A:
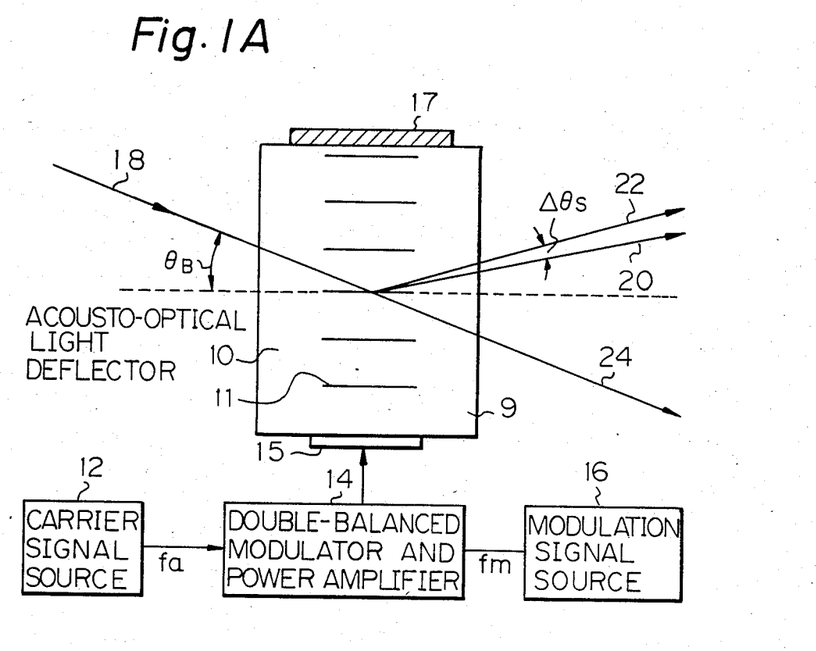
FIG. 1A is a diagram for illustrating the basic principles of operation of an acousto-optical light deflector.
Figure 1B:
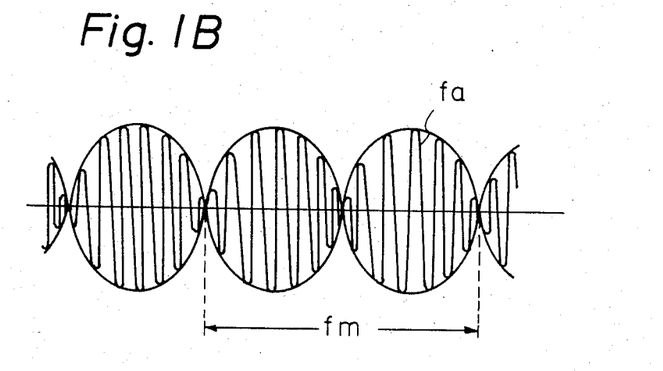
FIG. 1B is a waveform diagram illustrating a double-sideband signal applied to drive the acousto-optical light deflector in FIG. 1A.

Before describing in detail an embodiment of a surface shape measurement apparatus according to the present invention, a brief summary will be given of the basic principles of an acousto-optical light deflector suitable for use with the present invention. Referring to FIG. 1A, an acousto-optical light deflector 10 comprises a medium 9 which is transparent to light and suited to propogation of ultrasonic acoustic waves, with a piezo-electric transducer 15 acoustically coupled to the medium. Numeral 17 denotes an acoustic absorption member. Numeral 14 denotes a combination of a double-balanced modulator circuit and a power amplifier circuit for amplifying the modulator output. A carrier signal source 12 inputs a high-frequency carrier signal at frequency $f_2$ to the modulator circuit, while a modulation signal source applies a sinusoidal waveform modulation signal of lower frequency, $f_m$, which is applied as a modulation signal to the modulator circuit. As a result, an output signal is applied to piezo-electric transducer 15 having the waveform illustrated in FIG. 1B, i.e. which comprises the sideband frequency components $(f_a+f_m)$ and $(f_a-f_m)$. Ultrasonic travelling acoustic waves are thereby generated in medium 9, as indicated by numeral 11, which produce successive regions of relatively increased and decreased coefficient of refraction in medium 9. As a result, medium 9 serves to diffract and to frequency modulate light which passes therethrough. Numeral 18 denotes a beam of polarized light which is emitted from a source such as a laser and enters medium 9 at an angle $\theta_B$ with respect to the transverse direction of the transverse direction of the travelling acoustic waves, and is thereby split into a non-diffracted component 24 and two diffracted component light beam 20 and 22. This diffraction phenomenon has been described in detail in, for example, a paper by Baronian presented at the IEEE 1974 Region Six Conference, entitled "Acousto-optic Bragg Diffraction Devices and their Applications", and is basically analagous to the diffraction of X-rays in crystals. The optimum value of the input angle of incidence $\theta_B$, with regard to maximizing the diffracted light component, is therefore referred to as the Bragg angle.

Designating the frequency of the light waves in the incident light beam 18 as $f_0$, frequency modulation of the incident light beam is performed within medium 9, whereby the diffracted component light beams 20 and 22 have the respective frequencies $(f_0+f_a+f_m)$ and $(f_0+f_a-f_m)$.

The angle of divergence between the two diffracted light beams 20 and 22 is determined by the frequency difference between them, and hence can be varied by variation of the modulation frequency $f_m$.

The degree of diffraction produced, and hence the direction at which the pair of light beams 20 and 22 emerge from the acousto-optical light diflector, can be varied by varying the carrier frequency $f_a$. However to produce major changes in this direction, it is necessary to ensure that the direction of incidence of the incoming light beam is held close to the Bragg angle. In a surface shape measurement apparatus according to the present invention, scanning of a pair of light beams across a surface under measurement is performed by producing the light beams from an acousto-optical light deflector as illustrated in FIG. 1A, and sweeping the carrier frequency $f_a$ in a succession of decrements or increments of uniform value, to thereby successively deflect the light beams 20, 22 by successive angular amounts. The value of the Bragg angle varies in accordance with the frequency of the acoustic waves generated within medium 11, i.e. in accordance with the carrier frequency $f_a$. Thus if only a single piezoelectric transducer 15 is utilized, as shown in FIG. 1A it will not be possible to vary the beam deflection over a substantial angle. However this problem can be overcome by using a "phased beam array", i.e. a set of piezoelectric transducers which are successively selected as the carrier frequency changes, and are respectively positioned such as to maintain the angle between the wavefront of the travelling acoustic waves and the incident laser light beam close to the Bragg angle throughout the carrier frequency sweep.

A suitable drive circuit to perform the functions of circuit blocks 12 and 14 in the example of FIG. 1A, is commercially available from IntraAction Corp. of Bensenville, Ill., USA, under the designation Model DE-70M VCO Deflector Drive. This incorporates a voltage-controlled oscillator (VCO) serving as carrier signal source 12, whose frequency can be varied to provide the sweep function described above by application of a suitable control signal waveform. An acousto-optical light deflector for use with this drive circuit is marketed by the same company under the designation Model AOD-70 Acousto-Optic Light Deflector.

With the heterodyne interference of light method of surface shape measurement, a pair of light beams of mutually different frequencies, spaced a fixed distance apart, directed onto the surface under measurement to be reflected therefrom, and the reflected beams are made to interfere while incident on a photo-electric transducer. A beat-frequency signal is thereby produced by the transducer, varying in accordance with the interference, whose frequency is equal to the frequency difference between the two light beams.

For example, if light of frequency fl is designated as E1, and light of frequency f2 is designated as E2, then these can be expressed as time functions as follows:

$$E_1(t) = A_1(t) \cos(2\pi f_1 t + \phi_1(t))$$

$$E_2(t) = A_2(t) \cos(2\pi f_2 t + \phi_2(t))$$

Here, A1 and A2 denote amplitudes, and o1, o2 denote phase.

If these light waves are allowed to interfere, then the amplitude I(t) of the interference is given as:

$$I(t) = |E1(t) + E2(t)|^2$$

If this is converted to an electric current i(t) by a photo-sensor, then the following electrical signal can be obtained:

$$i(t) \alpha A_1^2 + A_2^2 2.A_1 A_2 \cos(2\alpha \Delta ft + \Delta\phi)$$

Here, $\Delta f = f1 - f2, \Delta\phi = \phi1 - \phi2$

Changes in phase of this signal can easily be measured if f is in the range $10^5$ to $10^6$ Hz, approximately, and this phase will vary in direct accordance with changes in phase difference between the two reflected light beams. Thus, if such a pair of light beams is reflected from a surface, to then fall upon a photo-electric transducer, then any difference in surface height between the points on which the beams fall will result in a change in the respective path lengths of the reflected beams, which can be regarded as change in phase difference between the beams. Thus, such a difference in surface height can be measured as a shift in phase of the output signal from the photo-electric transducer sensing ther light interference.

Figures 2, 4:
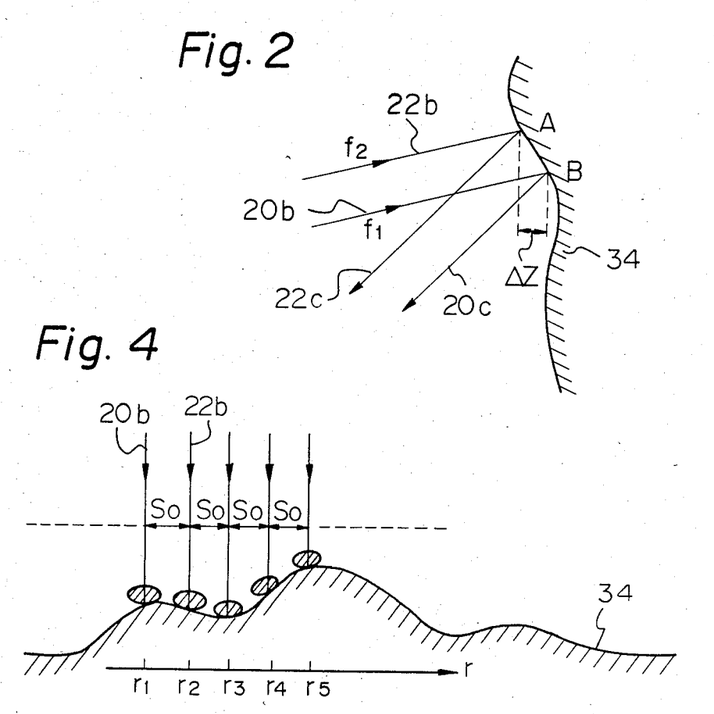
FIG. 2 is a diagram illustrating the relationship between a pair of light beams incident on a surface under measurement, and the resultant reflected light.
FIG. 4 is a diagram illustrating the manner in which a probe light beam pair are successively stepped across a surface under measurement.

This process is illustrated in FIG. 2, in which a pair of light beams 20b, 22b, are incident on a surface 34 at positions A and B respectively, with there being a difference in height z between these positions (i.e. a height difference measured along the direction of the incident light beams). Such a height difference will produce a corresponding difference in path length of the reflected light beams 20c, 22c, when these reach an photo-electric transducer, which can be expressed as a phase shift of the photo-electric transducer output signal as described above.

Figure 3:
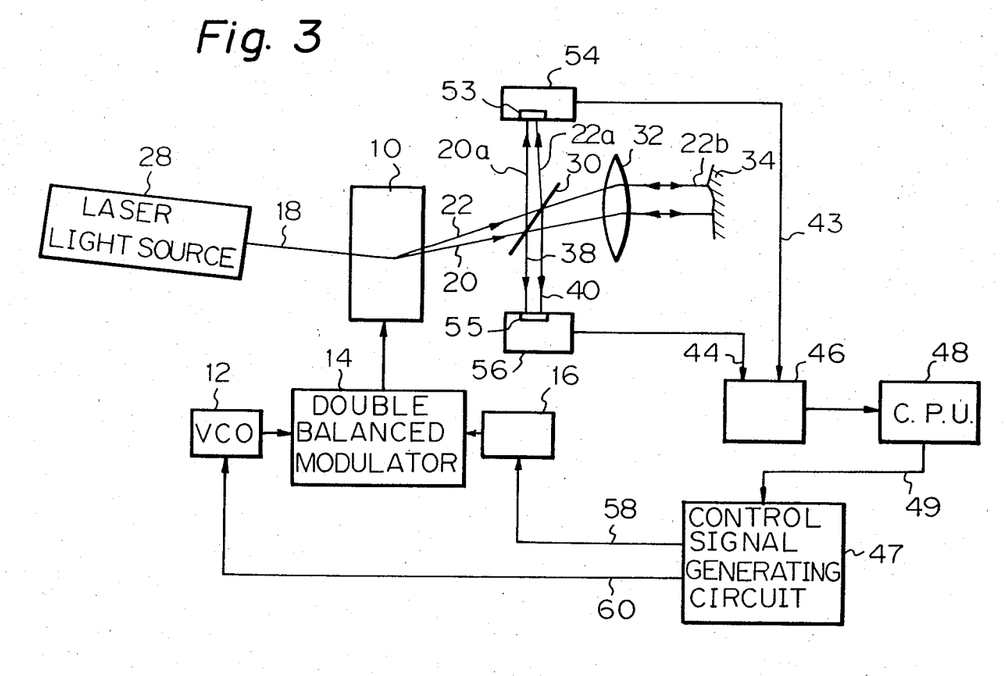
FIG. 3 is a general block diagram of an embodimant of a surface shape measurement apparatus according to the present invention.

FIG. 3 is a block diagram of an embodiment of a surface shape measurement apparatus according to the present invention. A single light beam 18, at a frequency $f_0$, is emitted from a laser light source 28, and is incident upon an acousto-optical element 10. Ultrasonic travelling waves are generated within acousto-optical light deflector 10 by a drive signal applied from a double-balanced modulator circuit 14, operating from a carrier signal of frequency $f_a$ produced from a carrier signal source 12 which comprises a voltage-controlled oscillator circuit (VCO), and a modulation signal of frequency $f_m$ applied from a modulation signal source 16, as described hereinabove referring to FIG. 1. A pair of light beams 20, 22 are thereby output from acousto-optical light deflector 10, with an angle of divergence and frequency difference between them whose values are determined by the value of modulation frequency $f_m$ and which are deflected with respect to the incident laser light beam 18 by an angle determined by the carrier frequency $f_a$. Light beams 20 and 22 contain the frequency components $(f_0+f_a-f_m)$ and $(f_0+f_a+f_m)$ respectively, where $f_0$ is the frequency of laser light beam 18.

Numeral 30 denotes an optical isolator, which is made up of a polarizing beam splitter and a ¼ wavelength plate, the latter being disposed on the opposite side of the polarizing beams splitter to acousto-optical deflector 10. This optical isolator 30 is positioned between acousto-optical element 10 and the surface under measurement 34. The two light beams 20 and 22 are each split by optical isolator 30 into light beams travelling in two different directions. As a result, reference light beams 20a, 22a are produced, which do not impinge upon the surface under measurement 34, while the light which emerges from optical isolator 30 in the other direction, and will be referred to as a probe light beam pair, passes through a condenser lens 32 to be thereby focussed onto the surface under measurement as two extremely small-diameter spots separated by a fixed spacing. The value of this spacing can be varied by altering modulation frequency $f_m$, to thereby alter the angle of divergence between light beams 20, 22.

The resultant light beam pair reflected from surface 34, designated by numerals 38, 40, then passes through condenser lens 32 and is reflected by optical isolator 30 onto a photo-electric transducer section 56 which includes a photo-receptor 55 to perform photo-electric conversion of interference between the reflected light beams 38, 40. Numeral 54 denotes a photo-electric transducer section which includes a photo-receptor 53 positioned to perform photo-electric conversion of the interference between reference light beams 20a, 22a. Each of these photo-electric transducer sections can comprise for example a PIN photo-diode used as a photo-receptor, and a current-voltage converter, with the beat frequency signal current produced by the PIN photo-diode being converted to a voltage signal.

As described hereinabove, there will be a shift in phase between the reflected light beams 38 and 40, whose magnitude will be determined by the difference in surface height between the points on surface 34 at which the light beams from condensor lens 32 are respectively incident, and with the direction of the phase shift being determined by the direction of that height difference. As a result, corresponding shifts will occur in the phase of the beat frequency signal generated by interference between light beams, from photo-electric transducer section 56. If the DC component is removed from each of the output signals from photo-electric transducer sections 54 and 56, then the resultant AC voltage signal which is output on line 43 will be fixed in phase, and will be referred to in the following as the phase reference signal, while a phase measurement output signal from photo-electric transducer 56 appearing on line 44 will vary in phase in direct accordance with any phase difference between reflected light beams 38, 40, i.e. in direct accordance with any difference between the heights of the positions on surface 34 from which light beams 38, 40 are reflected. The frequency of both the phase reference signal and the phase measurement signal is the difference between the frequencies of light beams 22, 20, i.e. $2f_m$. In the following, it will be assumed that the phase reference signal represents zero phase. That is to say, if the probe light beam pair 20b, 22b fall upon positions on surface 34 which are perfectly coplanar in a plane aligned perfectly perpendicular to the direction of the probe light beam pair, then the phase measurement signal will be exactly in phase with the phase reference signal. Any deviation from this condition will result in a change in phase of the phase measurement signal whose polarity and amplitude are respectively determined by the direction and the magnitude of the difference in height between the positions of incidence of the probe light beam pair (i.e. quantity $\Delta z$ illustrated in FIG. 2). The value of the phase of the phase measurement signal appearing on line 44 is measured by means of a phase comparator circuit 46, which compares the phase measurement signal with the phase reference signal phase.

The value of surface height difference $\Delta z$ can be expressed as:

$$\Delta z = \lambda \Delta\phi/(4\pi)$$

In the above, $\lambda$ is the wavelength of the light output from the laser, and $\phi$ denotes the phase of the phase measurement signal, defined as described above assuming the phase reference signal phase as zero. If a He-Ne laser is used, then $\lambda = 0.6328$ $\mu$m, so that $\Delta z$ has a value of 8.8 angstroms per degree of change in phase of the phase measurement signal. The maximum value of surface height difference which can be measured in this way is equal to $\pm \lambda/4$.

Numeral 48 denotes a central processing unit, comprising for example analog-digital converters, data-processing circuits and memory circuits, for processing the phase values produced by phase comparator 46 as described hereinafter, and which can be based on a personal computer.

Numeral 47 denotes a control signal generating circuit, for producing a signal of analog type on output line 60 to control the value of carrier frequency $f_a$ produced by VCO 12 to thereby control the angle of deflection of light beams 20, 22, and a control signal on line 58 for controlling the frequency $f_m$ of the modulation signal from modulation signal source 16 to thereby control the angle of divergence between light beams 20, 22.

The change $\Delta\theta d$ in the angle of deflection of light beams 20, 22 produced by a change $\Delta f_a$ of the carrier frequency is given as:

$$\Delta\theta d = \lambda \Delta f_a / V_a$$

Where $V_a$ is the acoustic velocity within acousto-optical light deflector 10, and $\lambda$ is the wavelength of laser light beam 18.

The angle of divergence $\theta_B$ between deflected light beams 20, 22 is given as:

$$\theta_b = \lambda \cdot 2 f_m / V_a$$

Referring now to FIG. 4, the method of scanning over surface 34 is illustated. Initially, the probe light beam pair 20b, 22b, spaced apart by the fixed separation $S_0$, are respectively incident on positions r1, r2 of the surface, and the height difference Z between them is measured as a phase difference as described above. A first scanning step is then performed, whereby light beams 20b, 22b are shifted by an amount equal to the separation $S_0$ between them, so that now they are incident on positions r2, r3 respectively, that is to say, the trailing beam 20b is now incident on the previous position of leading beam 22b. A second step is then performed, of equal amplitude to the first, then a third, and so on. The intervals between each step, during which the phase measurement is performed, are of uniform duration.

Figure 5:
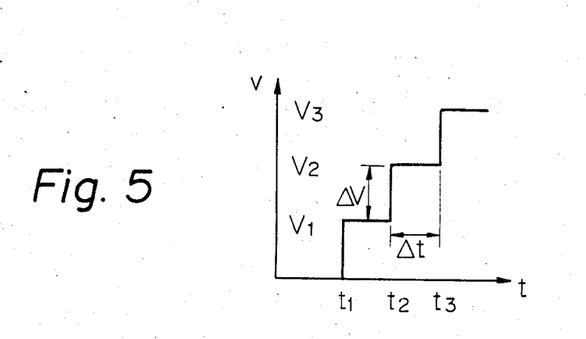
FIG. 5 is a waveform diagram illustrating a step voltage applied to control the carrier frequency applied to the acousto-optical light deflector in the embodiment of FIG. 2.

FIG. 5 illustrates a waveform for the analog control signal applied over line 60 in FIG. 3 to VCO 12, whereby a succession of uniform increments of the angle of deflection of the light beam pair 20, 22 from acousto-optical light deflector 10 is produced, to hereby produce a succession of steps of the form shown in FIG. 4. Each control voltage step is of uniform amplitude, $V_i$, and of uniform duration, t.

Figure 6A:
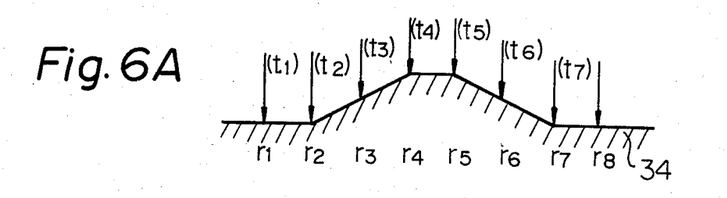
FIG. 6A to 6C are diagrams for illustrating phase measurement errors produced when a probe light beam pair is scanned across a surface under measurement.
Figure 6B:
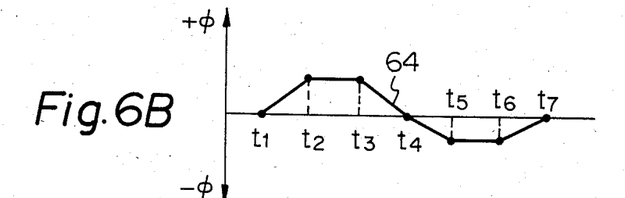
Figure 6C:
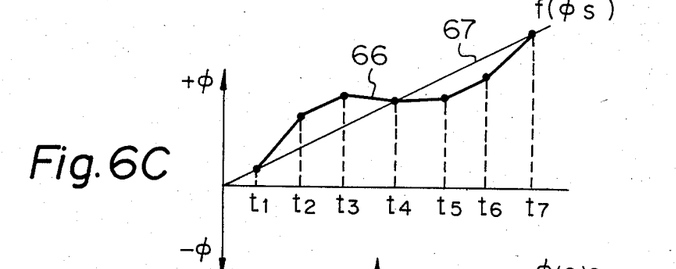
Figure 7:
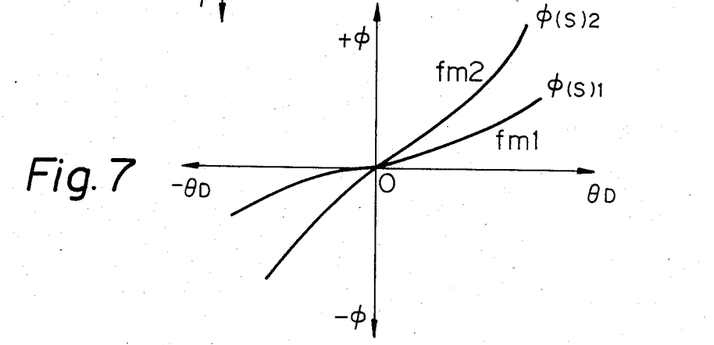
FIG. 7 is a graph ilustrating the relationship between phase measurement error and the degree of deviation of the probe light beam pair from the optical axis of the measurement system.

FIG. 6A shows an example of beam scanning across a surface having a very simple shape, for ease of explanation. Initially, the probe light beam pair are positioned at positions r1, r2 respectively, while measurement of the corresponding value of phase is performed at time t1. The beams are then stepped into positions r2, r3 respectively, and phase measurement performed at time t2, and so on, until time t7. The resultant set of measured phase values is represented graphically in FIG. 6B, on the assumption that the overall system does not introduce measurement errors. At time t1, both light beams are incident on a perfectly plane portion of surface 34 which is aligned perpendicular to the beam direction, so that the measured phase value is zero as described hereinabove. At time t2 and at time t3, the beams are both incident on a slope of fixed inclination, so that the height difference between the positions of incidence is equal in each case, and hence the measured phase values are equal. In a similar manner, phase values corresponding to the surface shape are measured at times t4 to t7, with the phase polarity being reversed when the slope inclination angle is reversed. However as the angle of deflection of beams 20, 22 shown in FIG. 3 deviates from the direction of the optical axis of the system which directs and focusses probe light beam pair 20b, 22b, errors of increasing magnitude are introduced into the measured phase values. As a result, the set of measured phase values obtained for the case of FIG. 6A might appear as shown in FIG. 6C. Each of this set of values can be regarded as the sum of an error value (whose magnitude varies with the degree of beam deflection, i.e. with the scanning position) and a true phase value. This set of error values can be regarded as varying in accordance with a continuously varying function, which will be referred to as the phase error function. The phase error function varies as the modulation frequency $f_m$ is varied, but basically approximates to a third-order curve having a value of zero when the angle of deflection of light beam pair 20, 22 is zero. This is illustrated in the graphs of FIG. 7, in which phase error functions $\phi(s)1$ and $\phi(s)2$ are plotted as variations of measured phase o with respect to angle of beam deflection, and result for modulation frequencies $f_m 1$ and $f_m 2$ respectively, with phase error function $\phi(s)2$ being equal to phase error function $\phi(s)1$ multiplied by the factor $f_m 2 / f_m 1$.

With a surface shape measurement apparatus according to the present invention, each measurement operation comprises scanning the probe light beam pair over the surface in steps of uniform amplitude. A set of phase error values are derived by CPU 48 from the resultant output signals produced by phase comparator 46, i.e. values which vary according to an error characteristic of the form shown in FIG. 7. These values are then subtracted from a set of measured phase values derived by a scanning operation the form described hereinabove with reference to FIG. 4, i.e. with the probe light beam pair being stepped in a successively overlapping manner, a set of phase values being obtained thereby which include the measurement errors described above, and will be referred to as the uncorrected phase values. The phase error value corresponding to each scanning step is then subtracted from the uncorrected phase value obtained for that step, to thereby derive a set of corrected phase values, from which the effects of measurement system errors have been eliminated. These values are then integrated, to produce a set of data values representing the surface shape. By repeating a plurality of such double scan operations over successively adjacent strips of the surface under measurement, the overall surface shape can be obtained.

A first method of deriving the phase error function will now be described, in which each measurement operation comprise a pair of immediately consecutive scans over the same surface portion. During the first scan, a control signal applied over line 58 from control signal generating circuit 47 to modulation signal source 16 sets the modulation frequency $f_m$ to a value such that angle of divergence of deflected light beams 20, 22 is reduced to such a degree that the spacing between probe light beams 20b, 22b becomes less than the minimum for which the beams can be resolved, i.e. less than the distance set by the Rayleigh criterion for resolution of adjacent light beams of circular cross-section. The probe light beam pair 20b, 22b thereby substantially mutually overlap, so that the phase of the output signal produced by photo-electric transducer 56, resulting from heterodyne interference between the reflected light beams 38, 40, will be independent of variations in height of surface 34. Thus, the set of phase values obtained during this first scan will vary in accordance with the phase error function, e.g. if the modulation frequency $f_m$ during the first scan is assumed to be $f_m1$ shown in FIG. 7, then the set of values thus derived will vary in accordance with phase error function $\phi(s)1$. Assuming that the modulation frequency value to be used during actual surface measurement is $f_m2$ shown in FIG. 7, CPU 48 then acts to multiply each of the phase values obtained from the first scan by the factor $f_m2/f_m1$. In this way, a set of phase error value is obtained, which vary in accordance with phase error function $\phi(s)2$. A second scan is then performed, as described hereinabove with reference to FIG. 4, with control signal generating circuit producing a signal causing modulation signal source to set the modulation frequency $f_m$ to the value $f_m2$, to thereby set the spacing between probe light beam pair 20b, 22b to an amount equal to the amplitude of each scanning step, i.e. spacing $S_0$ shown in FIG. 4. A set of uncorrected phase values are thereby produced from phase comparator 46, each representing the sum of a true phase value and an error value. The corresponding phase error values are then subtracted from these uncorrected phase values, to derive the corrected phase values. These are then integrated, to derive data values representing the shape of the surface strip measured during that pair of scans.

The set of true (i.e. corrected) phase values can be expressed as:

$$(\phi_p1, \phi_p2, \ldots, \phi_pn)$$

while the set of phase measurement error values can be expressed as:

$$(\phi_s1, \phi_s2, \ldots, \phi_sn).$$

The set of uncorrected phase values generated as described above by the second scan, can therefore be expressed as:

$$\phi_{(s+p)}1, \phi_{(s+p)}2, \ldots, \phi_{(s+p)}n$$

Thus the set of corrected phase values $\phi_pi$ can be derived from the set of uncorrcted phase values $\phi_{(s+p)}i$ by the operation:

$$\phi_pi = \phi_{(s+p)}i - \phi_si$$

The surface shape as measured along the line of scan is thereby obtained by integrating the corrected phase values, e.g. is given as the integral:

$$\sum_{i=0}^{i=n} \phi_pi$$

If CPU 48 comprises a general-purpose type of microcomputer or minicomputer, then the above operations can readily be accomplished by suitable programming.

Figure 8A:
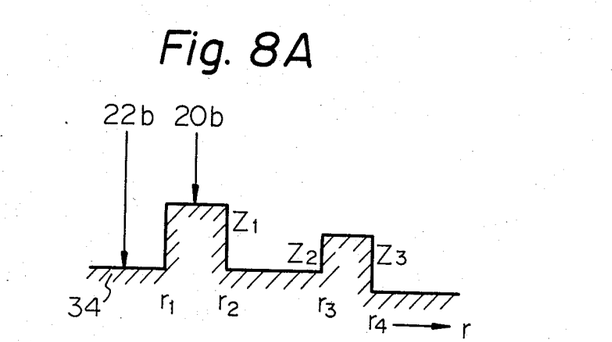
FIG. 8A to 8D, and FIG. 9A, 9B are diagrams for illustrating a method of deriving a phase error function and a set of corrected phase measurement values.
Figure 8B:
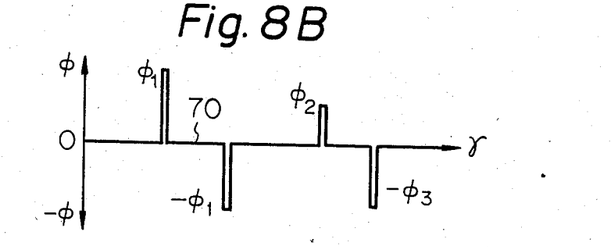
Figure 8C:
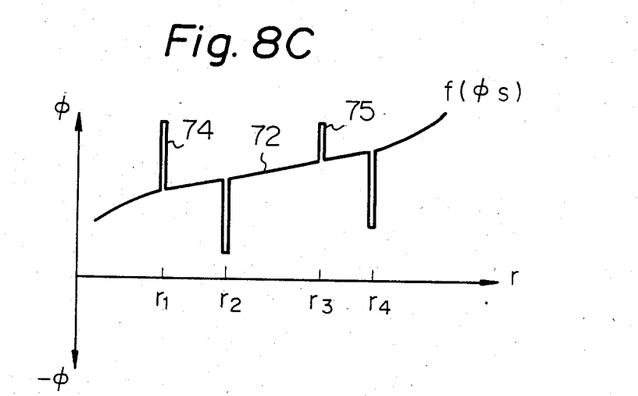
Figure 8D:
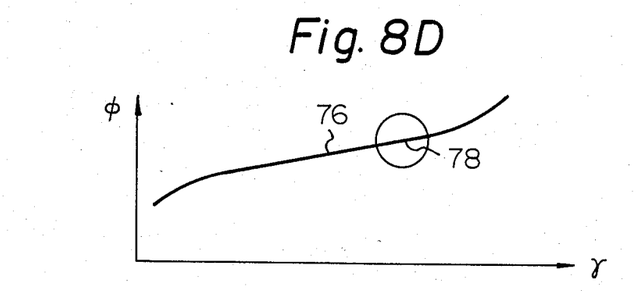

A second method of deriving the phase measurement error function will also be described, which is applicable to measurement of a surface shape of basically planar configuration, e.g. comprising a number of flat portions which may be situated in different mutually parallel planes as illustrated in cross-section in the example of FIG. 8A. Assuming that probe light beam pair 20b, 22b are scanned across the surface in a succession of steps as described above, in direction r, the resultant phase value $\phi$ produced by phase comparator 46 will vary as shown in FIG. 8B. Prior to position r1 the phase will be zero (assuming a perfectly smooth planar surface), while at position r1 the phase will attain a positive value $\phi1$ representing the magnitude of surface height difference Z1, and will thereafter return to zero, and so on, with phase values $-\phi1, \phi2, -\phi3$ respectively representing changes in surface height a positions r2, r3 and r4 along the line of scan. With this second method of deriving the phase measurement error function, each measurement operation consists of a single scan along a line portion of the surface, with the spacing between probe light beam pair 20b, 22b, being held fixed at the value used for surface height measurement (i.e. spacing $S_0$ which is equal to the scanning step amplitude, as shown in FIG. 4). During this scan, a set of uncorrected phase values are produced by phase comparator 46 as described hereinabove, i.e. with each value representing the sum of a quantity corresponding to a surface height difference and a quantity corresponding to measurement error, and these are stored by memory means contained in CPU 48. In addition, CPU 48 uses these phase values to derive a set of measurement error values corresponding to the phase measurement error function, which are then used to correct the stored uncorrected phase values. Such a set of uncorrected phase values, derived from the surface example of FIG. 8A, is illustrated graphically as curve 72 in FIG. 8C. As shown, this comprises a smoothly varying characteristic (corresponding to successive phase measurements of the planar portions of the surface) connected by jumps in phase value of large amplitude, e.g. 74, 75, which correspond to the surface height changes of magnitude Z1, Z2, .... As these phase values are produced by phase comparator 46 during the scan and are successively memorized, CPU 48 acts to detect any phase value which differs in magnitude from the phase value of the immediately preceding scanning step by more than a predetermined maximum value, and to ignore that large-magnitude phase value in the subsequent processing. In this way, a set of phase values are produced which can be represented as shown by characteristic 76 in FIG. 8D.

Figure 9A:
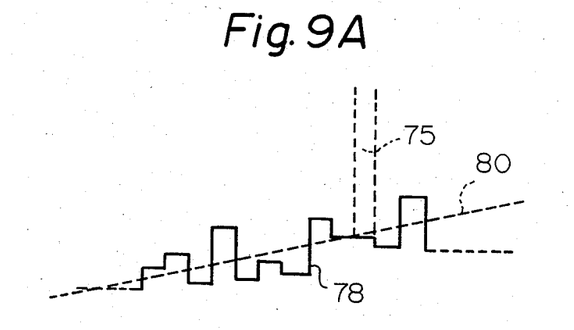

The surface measured will not in practice be ideally smooth, however the variations in measured phase value resulting from surface roughness are essentially random in distribution, e.g. as illustrated by expanded portion 78 of characteristic 76 shown in FIG. 9A. This set of phase values is therefore subjected to statistical averaging, by CPU 48, to thereby derive a set of phase values which follow a smoothly changing average characteristic as illustrated by numeral 80 in FIG. 9A. This average characteristic is an accurate approximation to the phase measurement error function.

Figure 9B:
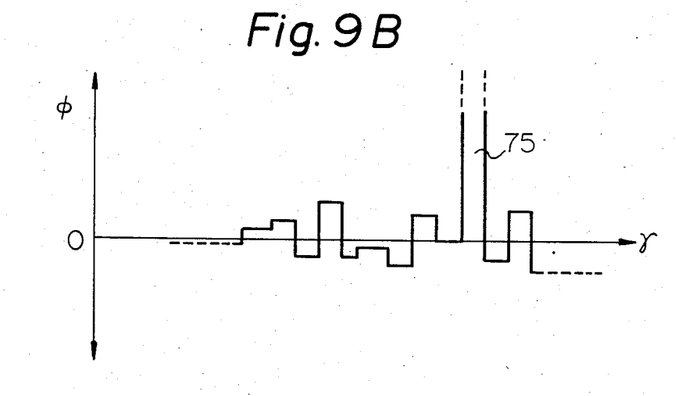

The set of uncorrected phase values, stored as described above, is illustrated graphically in FIG. 7C. These uncorrected phase values are then read out of storage, and the corresponding phase measurement error values for the successive steps, derived as described above, are subtracted from the uncorrected phase values by CPU 48. A set of corrected phase values are thereby derived, e.g. as illustrated graphically in FIG. 9B, which include both the small-magintude phase variations resulting from surface roughness and the large-magnitude phase variations which result from large changes in surface height, e.g. changes brought about by machining. This set of corrected phase values is then integrated by CPU 48 to derive data values representing the surface shape, as measured along the line of scan.

Figure 10:
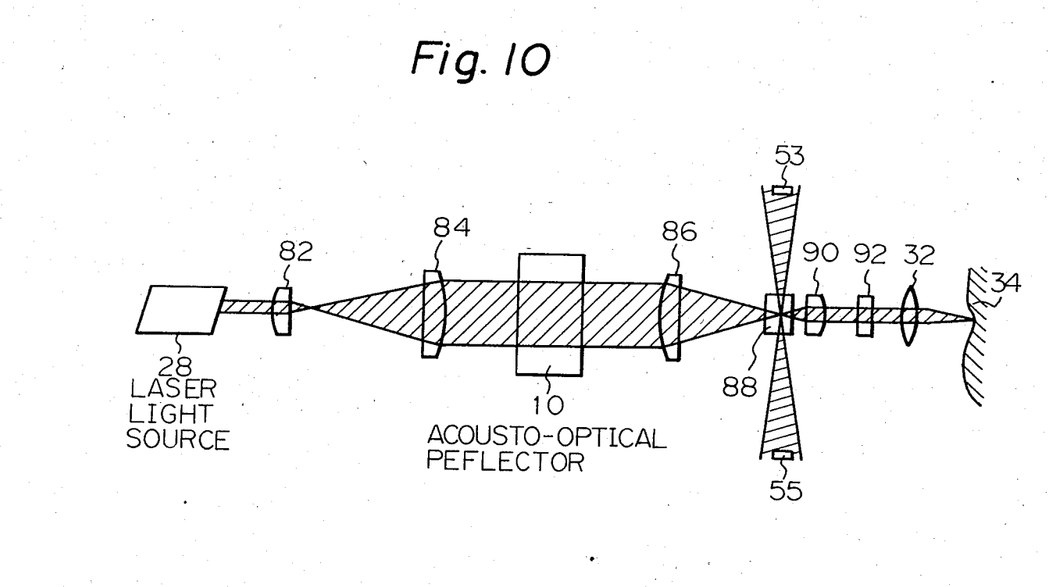
FIG. 10 is a general diagram of an example of an optical system for a surface shape measurement apparatus according to the present invention.

FIG. 10 illustrates an example of an optical system for the heterodyne interference of light surface measurement apparatus shown in FIG. 3. Numerals 82 and 90 denote cylindrical lenses each of which has a focal length of $L_1$. 84 and 86 are plano-convex lenses, each having a focal length of $L_2$. Numeral 88 denotes a polarizing beam-splitter, and 92 is a ¼ wave plate. Numeral 32 denotes a laser condenser lens having a focal length of $L_0$.

In order to attain aximum resolution for the diffraction produced by acousto-optical deflector 10, the light beam produced by laser light source 28 should be converted to have an elongated, i.e. elliptical cross-sectional shape, with the elongated axis being directed parallel to the paper as viewed in FIG. 10. For this purpose, a broad-width beam is produced by the combination of cylindrical lens 82 and plano-convex lens 84. In general, the beat frequency signals which are output from photo-electric transducer sections 54 and 56 will differ in amplitude from one another, but it is desirable to apply input signals to phase comparator 46 which are as uniform in amplitude as possible. The difference between the output signal amplitudes from photo-electric transducer sections 54 and 56 is basically due to the fact that the intensity of light reflected back from the surface under measurement will vary in accordance with the reflectance of that surface. To compensate for this, the relative amplitudes of signals 43 and 44 can be adjusted, if laser light source 28 produces a linearly polarized beam, by rotating the laser tube in light source 28 about the optical axis, so as to adjust the axis of linear polarization of the output light beam. This will result in a corresponding change in the relative proportions of light which is transmitted through beam splitter 88 to the surface under measurement and the light which is reflected onto photo-receptor 56.

It is preferable to arrange that the light beams which fall upon photo-receptors 52 and 54 are of elongated, i.e. elliptical cross-section. One advantage of this is that the intensity of light falling on each photo-receptor is thereby increased, by comparison with a circular cross-section beam pattern. Another important advantage is that, as the position of a photo-receptor is moved along the axis of elongation of such an incident beam pattern comprising two interfering beams, the phase of the output beat-frequency signal produced by that photo-receptor will vary. This allows the relative phases of the output signals from photo-electric transducer sections 54, 56 to be adjusted so that the output signal from section 54 serve as a "zero phase" reference signal, for phase comparison by phase comparator 46. As a result of the shaping of the incident beam entering acousto-optical deflector 10, the beams emerging from deflector 10 are also of elliptical cross-section, and so therefore will the reference beams falling on photo-receptor 54. The pair of beams which pass through cylindrical lens 90 are converted to have a ciurcular cross-section thereby, so as to minimize the spot size incident on the surface under measurement. However the resultant reflected beams pass back through sylindrical lens 90, and are thereby converted to elliptical cross-section before being reflected onto photo-receptor 58.

In the embodiment of FIG. 10, the two light beams which are split by acousto-optical deflector 10 are indicated as a single beam, for clarity of description. In addition, non-diffracted light is omitted from the drawing. The actual shapes of the light beams within the optical system are as illustrated in the partical detailed cross-sectional view of FIG. 11, which shows how the probe light beam pair are directed and focussed onto surface 34, and the reflected light beams 38, 40 are formed to have elongated cross-sections (i.e. elongated in a direction parallel to the plane of the paper). The cross-hatched portion in which reflected beams 38 and 40 overlap constitutes the region in which heterodyne interference between these beams is produced, and this portion is directed onto photo-receptor 55 to thereby produce a corresponding beat-frequency signal.

Figure 11:
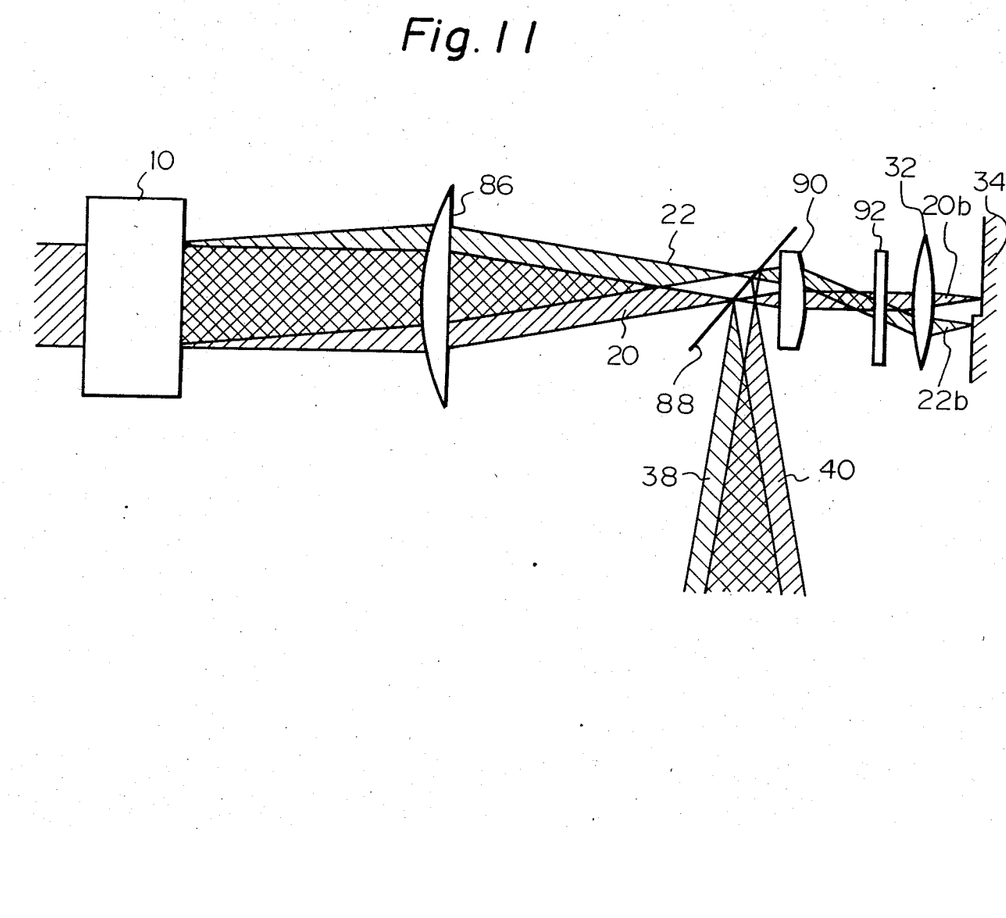
FIG. 11 is a detailed diagram of an important portion of the optical system of FIG. 10.

Designating the modulation frequency which determines the angle of divergence of the two light beams after leaving deflector 10 as $f_m$, the resultant distance $S_0$ separating the two light beams when they become incident upon the body surface being measured is given as follows:

$$S_0 = 2 \cdot L_2 \cdot L_0 \cdot \lambda f_m / (L_1 \cdot V_0)$$

Here, $V_0$ is the velocity of travel of sound waves within acousto-optical deflector 10. If for example $V_0 = 3.8$ km/sec, $L_1 = 15$ mm, $L_2 = 500$ mm, and $L_0 = 7$ mm, then if $f_m = 100$ kHz, the value of separation distance $S_0$ will be 7 micronmeters.

The amount of lateral displacement $\Delta S_d$ applied to probe beam pair 20b, 22b as a result of a change $f_a$ in the carrier frequency of the drive signal applied to acousto-optical deflector 10, is given as:

$$\Delta S_d = L_2 \cdot L_0 \cdot \lambda f_a / (L_1 \cdot V_a)$$

From the above, it will be understood that the present invention enables surface shape to be measured to a very high degree of accuracy, which has hitherto been attainable only with extremely complex and expensive equipment and moreover with equipment which is generally suitable for use only under carefully controlled environmental conditions, rather than in a normal industrial environment in which various disturbing factors such as oprating temperature fluctuations, vibration, etc are ineviatable, and that an apparatus acording to the present invention can be of simple configuration yet will provide satisfactory operation in spite of such external disturbing factors, due to the use of a dual-scan technique whereby the magnitude of errors due to such factors or other causes are accurately measured immediately prior to each measurement operation, to thereby provide error-free measurement results.

Although the present invention has been described in the above with reference to specific embodiments, it should be noted that various changes and modifications to the embodiments may be envisaged, which fall within the scope claimed for the invention as set out in the appended claims. The above specification shoud therefore be interpreted in a descriptive and not in a limiting sense.

What is claimed is:

1. A surface shape measurement apparatus for generating data representing the shape of a body surface, comprising:
   scanning means for producing a probe light beam pair comprising first and second light beams mutually differing in frequency and for directing said light beams onto said surface, and for scanning said pair of light beams across a portion of said surface in a succession of steps of fixed amplitude;
   phase detection means for sensing heterodyne interference between first and second reflected light beams from said surface resulting respectively from said first and second light beams incident thereon, to thereby producing during each of said scanning steps data representing a phase value which corresponds to a degree of phase difference between said first and second reflected light beams; and
   data-processing circuit means operating on said phase values produced by said phase detection means to produce a set of phase measurement error values which respectively represent an amount of measurement error produced during each of said scanning steps and are in accordance with a phase error function, and for subtracting from each of said phase values produced by said phase detection means the corresponding one of said phase measurement error values to thereby derive a set of corrected phase values, and for performing integration of said set of corrected phase values to derive said data representing the shape of said surface.

2. A surface shape measurement apparatus according to claim 1, in which said scanning of said surface portion is performed as consecutive first and second scans in which the separation between said first and second light beams of said probe light beam pair is held at a fixed fixed spacing and a second fixed spacing respectively, each of said first and second scans being of identical step amplitude, and in which during said first scan only a set of phase values representing measurement error values are derived by said phase detection means and in which during said second scan the degree of separation between said light beams is such that during each step thereof, the position of incidence of said second light beam on said surface overlaps the position of incidence of said first light beam thereon during the preceding step, whereby each phase value derived by said phase detection means during said second scan is the sum of a quantity representing a surface height difference and a quantity representing measurement error.

3. A surface shape measurement apparatus according to claim 2, in which said first degree of separation established between said first and second light beams of said probe light beam pair during said first scan is made less than the minimum value set by Rayleigh's criterion for resolution therebetween, whereby the phase value produced by said phase detection means during each step of said first scan directly represents said value of phase measurement error produced during that step.

4. A surface shape measurement apparatus according to claim 3, in which said scanning means comprise:
   a laser light source for generating a polarized light beam;
   acousto-optical light deflector means for converting said light beam from said laser light source into a pair of light beams which mutually differ in frequency by a first fixed amount and a second fixed amount during said first and second scans respectively, are mutually divergent by a first fixed angle and a second fixed angle during said first and second scans respectively, and are deflected with respect to the direction of said laser light beam during each of said first and second scans by successive angular increments of uniform amplitude, the values of said frequency differences, angles of divergence and angular increments being controlled by said acousto-optical light deflector means;
   optical isolation means disposed such as to split said deflected pair of light beams into a reference light beam pair and a probe light beam pair respectively travelling in mutually different directions; and
   optical means for focussing said probe light beam pair onto said surface.

5. A surface shape measurement apparatus according to claim 4, in which said phase detection means comprise:
   first photo-electric transducer means;
   optical means for directing said reference light beam pair to be incident on said first photo-electric transducer means, whereby a reference signal is produced by said first photo-electric transducer means, resulting from heterodyne interference between said incident light beams, having a frequency which is equal to said light beam frequency difference established by said acoustooptical light deflector means;
   second photo-electric transducer means;
   optical means for directing said resultant first and second reflected light beams from said surface to be incident on said second photo-electric transducer means, whereby said reflected light signal is produced by said second photo-electric transducer means having a frequency which is equal to said light beam frequency difference established by said acousto-optical light deflector means and varying in phase in accordance with variations in phase difference between said first and second reflected light beams; and
   phase comparator circuit means coupled to receive said reference signal and said reflected light signal, for producing an output signal representing the magnitude of a phase difference between said reference signal and said reflected light signal, corresponding to a phase difference between said first and second reflected light beams.

6. A surface shape measurement apparatus according to claim 4, in which said acousto-optical light deflection means comprise:
   a piezoelectric transducer coupled to an optically diffracting medium, with said light beam from said laser light source being directed into said medium in a fixed direction;
   a voltage-controlled oscillator circuit for generating a carrier signal;
   a modulation signal source for generating a modulation signal of sinusoidal waveform and lower frequency than that of said carrier signal;

a source of a modulation control signal for controlling the operation of said modulation signal source such that said modulation signal attains a first fixed frequency during said first scan and a second fixed frequency during said second scan;

a source of a voltage-controlled oscillator circuit control signal having a waveform comprising a succession of voltage steps of uniform amplitude and duration, said voltage-controlled oscillation circuit control signal being applied to said voltage-controlled oscillation circuit to control the frequency of said carrier signal such as to produce corresponding successive step changes in frequency thereof;

a double-balanced modulator circuit for modulating said carrier signal with said modulation signal to produce a suppressed carrier double-sideband output signal;

said output signal being applied to drive said piezoelectric transducer to generate ultrasonic acoustic waves within said optically diffracting medium to thereby split said light beam from said laser light source into a pair of light beams emerging from said medium, whereby during said first scan, said pair of light beams differ in frequency by said first frequency difference and differ in deflection angle by first said angle of divergence as determined by said first modulation signal frequency, the value of said first angle of divergence being such as to set the separation between the first and second beams of said probe light beam pair to a distance less than the mininum established by Rayleigh's criterion, and whereby during said second scan said pair of light beams differ in frequency by said second frequency difference and differ in deflection angle by said second angle of divergence as determined by said second modulation signal frequency, whereby the spacing between said first and second beams of said probe light beam pair is made equal to said step amplitude, and with said pair of light beams being mutually deflected with respect to the direction of said laser light beam during both said first and second scans by a succession of angular increments of uniform magnitude, said angular increment magnitude being determined by the magnitude of said voltage steps applied to said voltage-controlled oscillator circuit.

7. A surface shape measurement apparatus according to claim 1, in which said scanning of said surface portion comprises a single scan during each step of which said first and second light beams of said probe light beam pair are separated by a fixed distance such that the position of incidence of said second light beam on said surface overlaps the position of incidence of said first light beam thereon during the preceding step, and in which said data-processing circuit means memorize said phase values successively produced by said phase detection means during said scan, detect the amount of change of amplitude of said phase values between successive scanning steps, and perform statistical averaging of the set of phase values produced in all of the steps of said first scan other than phase values which exceed a specific amplitude with respect to the phase value of the immediately preceding step, to thereby derive a set of phase measurement error values corresponding to said phase error function, and moreover subtract said phase measurement error values from the corresponding ones of said memorized phase values to thereby derive said corrected phase values.

8. A surface shape measurement apparatus according to claim 7, in which said scanning means comprise:

a laser light source for generating a polarized light beam;

acousto-optical deflector means for converting said light beam from said laser light source into a pair of light beams which mutually differ in frequency by a fixed amount, are mutually divergent by a fixed angle, and are deflected with respect to the direction of said laser light beam during each of said first and second scans by successive angular increments of uniform amplitude, the values of said frequency difference, angle of divergence and angular increments being controlled by said acousto-optical light deflector means;

optical isolator means disposed such as to split said deflected pair of light beams into a reference light beam pair and a probe light beam pair respectively travelling in mutually different directions; and optical means for focussing said probe light beam pair onto said surface.

9. A surface shape measurement apparatus according to claim 8, in which said phase detection means comprise:

first photo-electric transducer means;

optical means for directing said reference light beam pair to be incident on said first photo-electric transducer means, whereby a reference signal is produced by said first photo-electric transducer means, resulting from heterodyne interference between said incident light beams, having a frequency which is equal to said light beam frequency difference established by said acousto-optical light deflector means;

second photo-electric transducer means; optical means for directing said resultant first and second reflected light beams from said surface to be incident on said second photoelectric transducer means, whereby said reflected light signal is produced by said second photo-electric transducer means having a frequency which is equal to said light beam frequency difference established by said acousto-optical light deflector means and varying in phase in accordance with variations in phase difference between said first and second reflected light beams; and phase comparator circuit means coupled to receive said reference signal and said reflected light signal, for producing an output signal representing the magnitude of a phase difference between said reference signal and said reflected light signal, corresponding to a phase difference between said first and second reflected light beams.

10. A surface shape measurement apparatus according to claim 9, in which said acousto-optical light deflection means comprise:

a piezoelectric transducer coupled to an optically diffracting medium, with said light beam from said laser light source being directed into said medium in a fixed direction;

a voltage-controlled oscillator circuit for generating a carrier signal;

a modulation signal source for generating a modulation signal of sinusoidal waveform and lower frequency than that of said carrier signal;

a source of a voltage-controlled oscillator circuit control signal having a waveform comprising a succession of voltage steps of uniform amplitude and duration, said voltage-controlled oscillator circuit control signal being applied to said voltage-controlled oscillator circuit to control the frequency of said carrier signal such as to produce corresponding successive step changes in frequency thereof;

a double-balanced modulator circuit for modulating said carrier signal with said modulation signal to produce a suppressed carrier double-sideband output signal;

said output signal being applied to drive said piezoelectric transducer to generate ultrasonic acoustic waves within said optically diffracting medium to thereby split said light beam from said laser light source into a pair of light beams emerging from said medium with a fixed angle of divergence between each light beam of said pair, said pair of light beams differing in frequency by a fixed amount, said angle of divergence and frequency difference being determined by said modulation signal frequency, said light beam pair being deflected with respect to the direction of said laser light beam by a succession of angular increments of uniform magnitude, said angular increment magnitude being determined by the magnitude of said voltage steps applied to said voltagecontrolled oscillator circuit.

* * * * *